(12) United States Patent
Lydecker et al.

(10) Patent No.: US 10,812,187 B2
(45) Date of Patent: Oct. 20, 2020

(54) LIGHT UNIT AND METHOD OF LIGHT UNIT REPLACEMENT BASED ON A VISUAL LIGHT COMMUNICATION CODE STORED IN A DATA STORAGE MEMORY OF THE LIGHT MODULE OR THE DRIVER MODULE

(71) Applicant: ELDOLAB HOLDING B.V., Eindhoven (NL)

(72) Inventors: Stephen Haight Lydecker, Snellville, GA (US); Marc Saes, Eindhoven (NL)

(73) Assignee: ELDOLAB HOLDING B.V., Son En Breugel (NL)

( * ) Notice: Subject to any disclaimer, the term of this patent is extended or adjusted under 35 U.S.C. 154(b) by 0 days.

(21) Appl. No.: 16/320,378

(22) PCT Filed: Aug. 10, 2017

(86) PCT No.: PCT/NL2017/050529
§ 371 (c)(1),
(2) Date: Jan. 24, 2019

(87) PCT Pub. No.: WO2018/030895
PCT Pub. Date: Feb. 15, 2018

(65) Prior Publication Data
US 2019/0268071 A1 Aug. 29, 2019

(30) Foreign Application Priority Data
Aug. 11, 2016 (NL) ..................................... 2017308

(51) Int. Cl.
*H04B 10/116* (2013.01)
*H05B 45/14* (2020.01)
(Continued)

(52) U.S. Cl.
CPC ........... *H04B 10/116* (2013.01); *H05B 45/14* (2020.01); *H05B 45/50* (2020.01); *H05B 47/20* (2020.01)

(58) Field of Classification Search
CPC .............. H04B 10/116; H05B 33/0848; H05B 33/0887; H05B 33/089; H05B 33/0884;
(Continued)

(56) References Cited

U.S. PATENT DOCUMENTS 9,363,857 B2 * 6/2016 Feri ..................... H05B 37/0272
9,600,983 B1 * 3/2017 Lydecker ................. G08B 5/36
(Continued)

FOREIGN PATENT DOCUMENTS

WO 2015199538 A1 12/2015

OTHER PUBLICATIONS

PCT Publication No. WO 2018/030895 A1 for International Application No. PCT/NL2017/050529, published Feb. 15, 2018, 21 pages.
(Continued)

*Primary Examiner* — Borna Alaeddini
(74) *Attorney, Agent, or Firm* — RatnerPrestia

(57) ABSTRACT

A method of replacing one of a light module and a driver module of a light unit includes reading a VLC code from a data storage memory of one of the light module and the driver. The visible light communication (VLC) code is transferred, via a connection between the light module and the driver module, and stored in the other one of the light module and the driver module. One of the light module and the driver module is elected for replacement. The VLC code from the other one of the light module and the driver module is transferred to the replaced one of the light module and the driver module. The transferred VLC code is stored in the data storage memory of the replaced one of the light module and the driver module.

16 Claims, 2 Drawing Sheets

Figure 1:
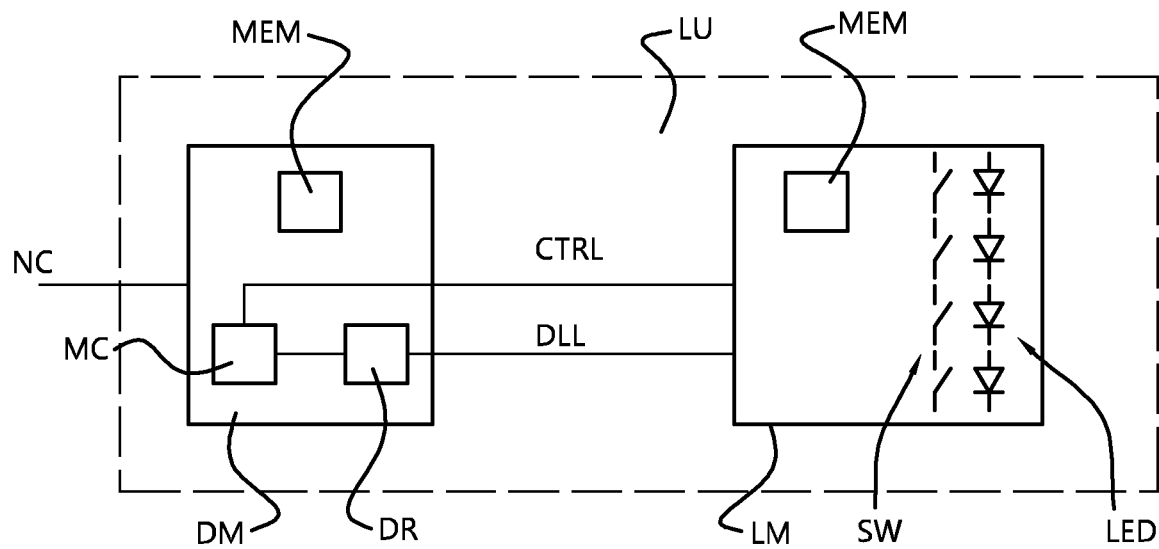

(51) Int. Cl.
*H05B 45/50* (2020.01)
*H05B 47/20* (2020.01)

(58) Field of Classification Search
CPC ........ H05B 37/03; H05B 45/14; H05B 45/50; H05B 47/20
See application file for complete search history.

(56) References Cited

U.S. PATENT DOCUMENTS

| | | | | |
|---|---|---|---|---|
| 2012/0091896 A1* | 4/2012 | Schenk | .............. | H05B 37/0245 |
| | | | | 315/132 |
| 2012/0119679 A1* | 5/2012 | Riesebosch | ........ | H05B 37/0272 |
| | | | | 315/313 |
| 2013/0343762 A1* | 12/2013 | Murayama | ......... | H04B 10/1141 |
| | | | | 398/130 |
| 2015/0003832 A1* | 1/2015 | Yamasaki | ............ | H04B 10/116 |
| | | | | 398/115 |
| 2015/0147067 A1* | 5/2015 | Ryan | .................... | H04B 10/116 |
| | | | | 398/118 |
| 2015/0305122 A1 | 10/2015 | Saes et al. | | |
| 2015/0372753 A1* | 12/2015 | Jovicic | ............... | H04B 10/1141 |
| | | | | 398/172 |
| 2016/0028477 A1* | 1/2016 | Jovicic | ................. | H04B 10/116 |
| | | | | 398/118 |
| 2018/0007247 A1* | 1/2018 | Aggarwal | ................ | F21S 11/00 |

OTHER PUBLICATIONS

International Search Report for International Application No. PCT/NL2017/050529, dated Oct. 26, 2017, 3 pages.
Written Opinion in International Application No. PCT/NL2017/050529, dated Oct. 26, 2017, 6 pages.

* cited by examiner

LIGHT UNIT AND METHOD OF LIGHT UNIT REPLACEMENT BASED ON A VISUAL LIGHT COMMUNICATION CODE STORED IN A DATA STORAGE MEMORY OF THE LIGHT MODULE OR THE DRIVER MODULE

This application is a U.S. National Phase Patent Application of International Application No. PCT/NL2017/050529, filed Aug. 10, 2017, which claims priority to Netherlands Application No. NL 2017308, filed Aug. 11, 2016, the disclosures of which also are entirely incorporated herein by reference.

The invention relates to a method of replacing one of a light module and a driver module of a light unit. Further, the invention relates to a light unit and to a lighting system comprising such light unit.

In (e.g. LED) lighting, a light unit commonly comprises a light module which comprises at least one LED or other light source, and a driver module which generates a drive signal (such as a drive current) for driving the LED or other light source. The light module and the driver module may be held by a holder, such as an armature, a mounting bracket, a mounting clip or any other holding device. It is noted that in this document, the term LED is to be understood as referring to a Light Emitting Diode. The light module may comprise one or more LEDs or one or more other light sources, such as filament light sources, arc lamp light sources, laser diodes, etc. The driver module may for example determine intensity and colour as radiated by the light source. Thereto, e.g. in the case of LED, the driver module may control a value of a driver current, may apply modulation schemes to the driver current, such as pulse width modulation to the LEDs of the light module, or any other suitable means.

Reverting to the example of LED, LED lighting systems may also be applied for emitting information. Thereto, use is for example made of the fact that an LED has a relatively short response time, enabling it to be switched on and off (or modulated in intensity) at a rate which is high compared to a response time of an observer, such as a human, thus staying unnoticed to the observer. This capability may not only be used to apply modulation schemes (in order to arrive at a desired average intensity or colour (as noticed by the observer) by means of for example pulse width modulation), but may also be used to modulate information onto the light output. The information may be read by an optical sensor, such as a camera. Such transmission of information may be identified by the term visual light communication.

Many application areas of visual light communication may be envisaged. As non-limiting examples, video streams or audio streams may be transmitted, location based information may be emitted, etc.

An application area of visual light communication may include the emitting of position related information. Thereby, in case the light units each have a defined position (e.g. a location in a building) position information may be derived from information emitted by the light units. For example, in case an optical detection device captures visual light communication information from one or plural light units, a position of the optical detection device may be determined in respect of the light units. The optical detection device may for example be a camera, such as a camera of a telephone or other personal computing device carried by a person.

The optical detection device may for example derive position information by imaging a plurality of the luminaries and deriving a position from the image of the light units in respect of each other, and/or or by means of other techniques, such as triangulation.

The light units may identify themselves to the optical detection device by means of (optically) emitting a code, also referred to as a VLC code. Each of the light units in a certain area may form example have uniquely assigned thereto a specific VLC code. The code may for example be emitted repetitively by the light unit, so as to enable an optical detection device to derive identification/position information from the VLC code. In order to determine a position, the optical detection device may for example consult a map (such as a digital map) in which the positions of the light units and their respective identifications/VLC codes are identified.

The VLC code may be formed by a code that is stored in the light unit whereby periodically the same VLC code is emitted by the light unit. Alternatively, so called rolling (dynamic) VLC codes may be used. Thereby, the light unit emits a VLC code that periodically changes its value. For example, a pre-set sequence of codes may be emitted, or the light unit may periodically be provided with a next VLC code, e.g. via a data network to which the light units are connected (e.g. via the drivers of the light units that are connected to a communication bus, such as a CAN bus or . . . bus). In case of the "rolling" VLC code, the light unit may be provided with a start VLC code or initialisation VLC code so that at system level the light units and their VLC code may be initialize, e.g. their positions in respect of each other may be stored in a digital map or similar whereby the luminaries are for example identified based on their VLC start code.

A problem associated with the use of VLC information may be that, upon replacement of a light unit or parts thereof, information that was stored in the replaced part, may get lost. For example, when replacing a light unit by another one, the VLC code stored in the replaced light unit may be lost, as the replacement light unit may not hold that same VLC code, requiring service personnel to either program the light unit with the same VLC code as the previous one, or make the new VLC code of the replacement light unit known at system level. The same applies when a part of a light unit is replaced, for example when the driver module or the LED light module is replaced.

The invention aims to at least partly solve the above problem.

In accordance with an aspect of the invention, there is provided: a method of replacing one of a light module and a driver module of a light unit, the light module being configured for emitting light when driven by an electrical driving signal; and the driver module being connected to the light module and configured for driving the light module by providing the electrical driving signal to the light module, wherein the light module and the driver module each comprise a data storage memory configured for storing data, wherein a visual light communication, VLC, code has been stored in one of the data storage memory of the light module and the data storage memory of the driver module, wherein the driver module is configured to drive the light module so as to optically emit, by means of a modulation of a light output of the light module, information based on the VLC code as stored in the one of the light module and the driver module, the method comprising:

a) reading the VLC code from the one of the data storage memory of the light module and the data storage memory of the driver module;

b) transferring the VLC code via a connection between the light module and the driver module;
c) storing the transferred VLC code in the other one of the light module and the driver module;
d) electing one of the light module and the driver module for replacement;
e) replacing the one of the light module and the driver module elected for replacement; and
f) transferring the VLC code from the other one of the light module and the driver module to the replaced one of the light module and the driver module and
g) storing the transferred VLC code in the data storage memory of the replaced one of the light module and the driver module.

According to the invention, both the driver module and the light module are provided with a memory. The VLC code is stored in both the memory of the light module and the memory of the driver module. Generally, the driver module will apply the VLC code so as to provide a modulation onto the light output, i.e. onto the signal provided by the driver module to the light module, that makes the light module optically emit the VLC code. Assume that a situation occurs wherein one module of the light unit (e.g. either the driver module or the light module) is to be replaced (e.g. as a result of an identified defect). Before replacement, the VLC code is communicated between the driver module and the light module, i.e. transmitted from the one of the modules that stores the VLC code to the other one of the modules. The module that receives the VLC code stores the VLC code in a memory of that respective module. As a result, the VLC code is then stored in both modules, i.e. the driver module as well as the light module.

For example, in case the VLC code would normally be stored in the driver module, according to the invention, the VLC code is communicated from the driver module to the light module and stored in the memory thereof, so that both modules hold the VLC code. In case one of the modules needs replacement, that module is removed and replaced by another one. The VLC code is then communicated from the not replaced module to the module that has been replaced. Plural possibilities for initiating the communication of the VLC code from the non-replaced module to the replaced module are described below. At a power-up, the driver module may inspect both its own VLC code and the VLC code as stored in the light module. When these codes appear to be not the same, an update may be initiated by the driver module, as follows: In case the driver module detects that one of the light module and the driver module does not have a VLC code stored at all, the VLC code of the other one of the light module and the driver module is read and transferred to one that does not have a VLC code stored. In case the driver module detects that one of the light module and the driver module has a VLC code stored therein having a value that is invalid or a value that signals that the VLC code at an (e.g. factory set) installation value, that VLC code is updated by transferring the VLC code from the other module. Other possibilities to detect a need of a transfer of the VLC code may include one or more of the following: The driver module detects during use if a load is present. If no load has been present for some time, the driver module assumes that the light module has been disconnected and/or exchanged, causing the driver module to transfer its VLC code to the light module. Similarly, a loop back signal from the driver module to the light module, the loop back signal closed by connecting the light module, could be used to signal the replacement of the light module. Furthermore, a communication bus between the driver module and the light module may be provided, which can be used to signal a loss of connection. Thereto, the driver module may for example send a polling signal to the light module, or the light module can periodically send an alive signal, or respond to a signal from the driver module that requests the light module to send an alive signal. Hence, the driver module monitors if contact can be established. If it appears that contact was lost and is regained, the driver module transmits its VLC code to the light module for storage in the memory of the light module. As a still further possibility the driver module may be provided with a push button or other inputting means, which may be activated upon exchange of the light module, causing the driver module to transmit its VLC code to the light module. When the driver module is exchanged, upon power up, the driver module may compare the VLC codes stored in the light module and the driver module, as described above, and proceed as described above.

When for example the driver module is removed and replaced by another one, the VLC code may be communicated from the light module to the driver module and stored therein. Thus, the modules effectively back up the VLC code so that, in case one of the modules is replaced, the VLC code may be retrieved from the other module. In case both modules would require to be replaced, according to an aspect of the invention, first one of the modules (driver module or light module) is replaced in accordance with the above approach, and after the VLC code has been communicated to the replaced module and stored therein, the other module may be replaced following the same approach.

It is noted that the method according to the invention may be applied in either way: The VLC code may be read from a memory in the driver module, communicated from the driver module to the illumination module and stored in a memory of the illumination module. Vice versa, the VLC code may be read from a memory of the illumination module, communicated from the illumination module to the driver module and stored in the driver module. In either situation, driver module or the light module may be replaced. Thus, in general, one module provides a back-up for the other module, and after a replacement of either one of the modules, the backed-up data is provided back to the replaced one of the modules.

The VLC code may be formed by any code, such as a binary number or any other data. The VLC code may for example comprise an 8 bit, 16 bit or 32 bit code. The VLC code may be emitted by means of light modulation (amplitude, colour), e.g. making use of any suitable modulation technique, such as frequency modulation, pulse width modulation, amplitude modulation, etc. The modulation may be performed at a frequency which is invisible or exhibits a low visibility to the human eye.

The VLC code may be emitted optically, i.e. by means of a light output and/or a modulation of a light output of the light unit.

The electing for replacement may be performed by a human operator or may be performed automatically, e.g. under control of a lighting controller to which the lighting unit is connected. The electing for replacement may be caused by for example a malfunctioning, an error condition as detected by the lighting controller, by the light module or by the driver module, etc.

The data storage memory (also briefly referred to as "memory" of the driver module or the light module may be formed by any suitable memory device, such as a microcontroller built in RAM or ROM memory, a separate memory chip (such as a RAM or ROM chip), etc. The memories of the driver module and the light module may be of the same or different type and construction.

The modules of the light unit may communicate with each other by any suitable means. For example, the modules may communicate with each other via a data communication line, such as a I²C bus, or any other data bus. The data communication may also be performed using an existing power connection between the driver module and the light module, for example using the Uni I/O protocol. Thus, the connection between the driver module and the light module may be formed by any suitable connection, such as a data communication connection applying any suitable communication protocol or a driver line (via which a drive current is provided to the light module). Using communication via the driver line, any suitable power line communication may be applied. Many communication possibilities are described in for example WO2010/056112, WO2012/091561 and/or WO2014/038944. As a further example, high frequency modulation over the LED driver lines that interconnect the driver module and the light module, may be applied.

The light module may comprise LEDs or any other light source, such as filament, arc lamp, laser diode, fluorescent, etc. The driver module may comprise a current source, a voltage source or other power source, and may incorporate any suitable modulation such as amplitude modulation, frequency modulation, phase modulation, pulse width modulation, etc.

The light unit may comprise a light fitting in which the light source is mounted or any other configuration, such as light sources (e.g. LEDs) on a printed circuit board. Furthermore, the light unit may make use of any light source, such as LED. The light unit may make use of chip-on board LED (the mounting of a bare LED chip in direct contact with the substrate to produce LED arrays), a light source (such as an LED) embedded in an integrated chip, or any other suitable technology.

In an embodiment, steps a)-c) are performed as part of an initialisation procedure: when initializing the light unit or when initializing one or both of the modules of the light unit (e.g. LED driver module and/or LED illumination module in the case of LED light sources), only one of the light module and the driver module may have the code stored in its memory. The following steps are performed:
reading the VLC code from the one of the data storage memory of the light module and the data storage memory of the driver module,
transferring the VLC code via a connection between the light module and the driver module, and
storing the transferred VLC code in the other one of the light module and the driver module.

By providing that the VLC code is backed-up in the other module as part of an initialisation procedure, the backup of the VLC code is performed as soon as possible, so that, in case a need for a replacement occurs, it is provided that a back-up of the VLC code in the other module has been made in time.

The above described steps a)-c) may be performed periodically (e.g. at fixed, pre-set time intervals) so as to provide that the VLC code is backed and refreshed at regular intervals.

Furthermore, the above described steps e), f) and g) may be performed when one of the light module and the driver module is diagnosed to be defective. The steps a), b) and c) may have been performed on beforehand, i.e. upon installation or upon each power-up of the light unit.

In an embodiment, steps a)-c) are performed in response to a change of the VLC code in the one of the data storage memory of the light module and the data storage memory of the driver module. The change may be detected by e.g. the driver module periodically requesting the VLC code and comparing the VLC code as received in response to the request, to a stored copy of the VLC code as received in response to a previous request.

In case of for example a rolling code, the VLC code as referred to in this document and as described above may be a VLC configuration initialisation code which initialises the rolling VLC code of the light unit in question (the VLC configuration initialisation code may hence form a starting point to initialize the assignment of rolling codes to the light unit).

In an embodiment, the one of the data storage memory of the light module and the data storage memory of the driver module is the data storage memory of the driver module.

According to another aspect of the invention, there is provided a light unit comprising
a light module configured for emitting light when driven by an electrical driving signal; and
a driver module connected to the light module and configured for driving the light module by providing the electrical driving signal,
the light module and the driver module each comprising a data storage memory configured for storing data,
wherein a visual light communication (VLC) code has been stored in one of the data storage memory of the light module and the data storage memory of the driver module,
wherein the driver module is configured to drive the light module so as to optically emit, by means of a modulation of a light output of the light module, VLC information based on the VLC code as stored in the one of the light module and the driving module
the light unit being configured for:
a) reading the VLC code from the one of the data storage memory of the light module and the data storage memory of the driver module
b) transferring the VLC code via a connection between the light module and the driver module
c) storing the transferred VLC code in the other one of the light module and the driver module, and in case one of the light module and the driver module has been elected for replacement and replaced, transferring the VLC code from the other one of the light module and the driver module to the replaced one of the light module and the driver module and storing the transferred VLC code in the data storage memory of the replaced one of the light module and the driver module.

According to yet another aspect of the invention, there is provided a lighting system comprising the light unit according to the invention.

It is noted that with the light unit and lighting system according to the invention, the same or similar advantages may be provided as with the method according to the invention. Also, the same or similar embodiments may be provided, providing the same or similar effects as described with reference to the embodiments of the method according to the invention.

Figure 2:
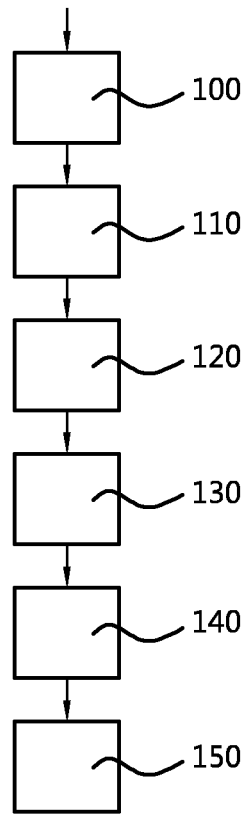
Figure 3:
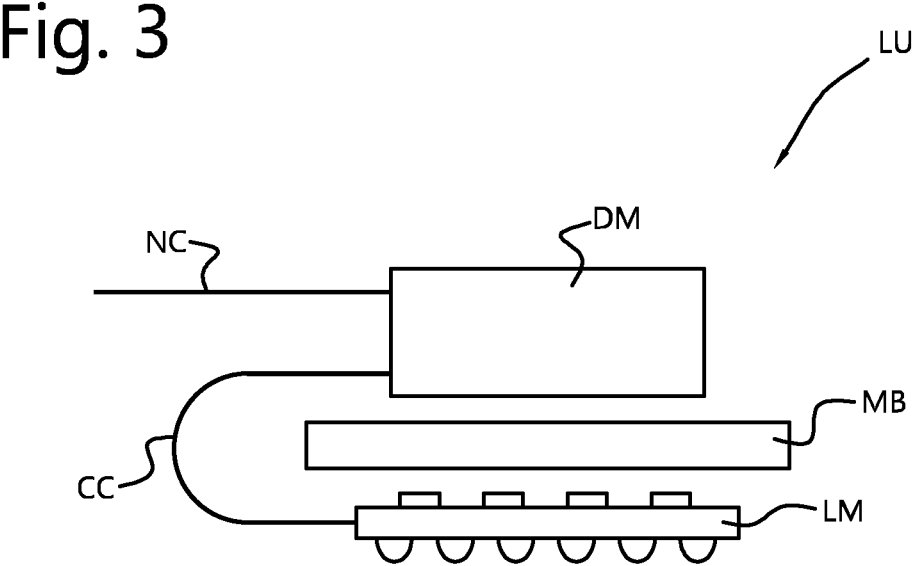

Further advantages, features and effects of the invention will follow from the enclosed drawing and corresponding description, in which non-limiting embodiments of the invention are described, wherein:

FIG. 1 depicts a schematic view of a light unit in accordance with an embodiment of the invention, FIG. 2 depicts a flow diagram in order to illustrate an operation of the light unit according to an embodiment of the invention and to illustrate the method according to an embodiment of the invention, and FIG. 3 depicts a schematic view of a light unit in accordance with an embodiment of the invention.

FIG. 1 schematically depicts a light unit LU such as a light fitting. The light unit comprises a holder HLD that holds an LED driver module DM and an LED light module LM. The LED light module comprises a plurality of LEDs (indicated as LED in FIG. 1). Optical means, such as a lens, a diffusor, coupling optics, a reflector, etc. may be provided to provide a desired light distribution of the light emitted by one or more of the LEDs. The LED driver module is provided with a control device, such as in this example a microcontroller MC. The microcontroller is provided with program instructions, for example stored in the memory MEM of the driver module. The driver module of the light fixture comprises a network connection NC via which the light fixture connects to a network. The network may be a data communication network, such as ethernet, an industrial network such as a CAN bus, a power line communication network, a wireless network, such as a WLAN, or a dedicated illumination control network such as Zigbee or DALI. The network connection allows the fixture to communicate, e.g. receive setpoint data or other operating data from e.g. a master controller of the illumination system of which the light unit forms part, and transmit information back to e.g. the master controller of the illumination system of which the light unit forms part or to transmit information to other light fixtures of the illumination system (e.g. in a daisy chain bus structure). The network connection in this embodiment connects to the microcontroller MC of the driver module. The microcontroller MC connects to an LED driver of the driver module, the driver comprising e.g. an LED driver current source that generates an LED drive current, the connecting of the microcontroller to the LED driver enables the microcontroller to control the LED driver. The LED driver module connects to the LED light module at least via an LED drive current line DCL, via which the LED drive current is provided from the driver of the LED drive module to the LED light module. The LED light module may for example comprise the LEDs in a series connection arrangement and switches, such as parallel switches in parallel to the LEDs or subgroups of the LED's so as to activate the LED or subgroup by setting the corresponding parallel switch in a non-conducting state and to de-activate the LED or subgroup by setting the corresponding parallel switch in a conducting state so that the LED or LED subgroup is bypassed. LED drive current modulation schemes are possible thereby. In order to operate such switches (e.g. the above described parallel switches) one or more control lines may connect the driving module to the light module, as schematically indicated in FIG. 1 by control line CTRL Both the LED driver module and the LED light module are provided with a memory MEM. The memory may be used for various purposes. For example the memory may hold suitable program instructions to make the microcontroller MC perform the controlling and communication as desired.

LED lighting systems may also be applied for emitting information. Thereto, use is for example made of the fact that an LED has a relatively short response time, enabling it to be switched on and off (or modulated in intensity) at a rate which is high compared to a response time of a human eye. This capability may not only be used to apply modulation schemes (thus arriving at a desired average intensity by means of for example pulse width modulation), but may also be used to module information onto the light output. The information may be read by an optical sensor, such as a camera.

Many application areas of visual light communication may be envisaged. As non-limiting examples, video streams or audio streams may be transmitted, location based information may be emitted, etc.

An application area of visual light communication may include the emitting of position related information. Thereby, in case the light units each have a defined position (e.g. a location in a building) position information may be derived from information emitted by the light units. For example, in case an optical detection device captures visual light communication information from one or plural light units, a position of the optical detection device may be determined in respect of the light units. The optical detection device may for example be a camera, such as a camera of a telephone or other personal computing device carried by a person.

The optical detection device may for example derive position information by imaging a plurality of the luminairies and deriving a position from the image of the light units in respect of each other, and/or by means of other techniques, such as triangulation.

The light units may identify themselves to the optical detection device by means of (optically) emitting a code, also referred to as a VLC code. Each of the light units in a certain area may for example have uniquely assigned thereto a specific VLC code. The code may for example be emitted repetitively by the light unit, so as to enable an optical detection device to derive identification/position information from the VLC code. In order to determine a position, the optical detection device may for example consult a map (such as a digital map) in which the positions of the light units and their respective identifications/VLC codes are identified.

The VLC code may be formed by a code that is stored in the light unit whereby periodically the same VLC code is emitted by the light unit. Alternatively, so called rolling (dynamic) VLC codes may be used. Thereby, the light unit emits a VLC code that periodically changes its value. For example, a pre-set sequence of codes may be emitted, or the light unit may periodically be provided with a next VLC code, e.g. via a data network to which the light units are connected (e.g. via the drivers of the light units that are connected to a communication bus, such as a CAN bus or Profibus, Ethernet, Wifi). In case of the "rolling" VLC code, the light unit may be provided with a start VLC code or initialisation VLC code so that at system level the light units and their VLC code may be initialized, e.g. their positions in respect of each other may be stored in a digital map or similar whereby the luminaries are for example identified based on their VLC start code.

Returning to FIG. 1, the VLC code may be stored in the memory MEM of the LED driver module DM. The microcontroller MC may accordingly read the VLC code from the memory of the driver module and drive the LEDs so as to optically emit the VLC code, e.g. by a suitable current modulation of the LED drive current provided by the driver, or by a suitable activation/de-activation via the switches SW in the light module. The optical emission of the VLC code may apply any suitable coding scheme. The VLC code may have any suitable length and coding and may be stored in the memory in any suitable way (such as but not limited to storage in. encrypted form). For example the memory may store the VLC code in the form of a VLC pre-code that contains information that allows the microcontroller to determine the VLC code as is to be optically emitted from the pre-code. For example, the VLC code may be formed from a light unit identification and a lighting system identification, whereby the light unit identification is stored in the memory of the driver module and the system identification is obtained via the network connection from a master controller. As another example, the VLC code may be a so called rolling VLC code, whereby the VLC code to be transmitted periodically changes and whereby an initialisation VLC code to initialise the rolling code sequence, is stored in the memory.

FIG. 2 depicts a flow diagram based on which a replacement of the LED driver module will be explained. The VLC code is read (step 100) by the microcontroller MC from the data storage memory MEM of the LED driver module. Then the LED driver module transfers (step 110) the VLC code from the LED driver module to the LED light module via the connection between the LED light module and the LED driver module. Thereto, use may be made of the control connection CRTL or of communication by the LED driver current line DCL. The transferred VLC code is stored (step 120) in the data storage memory MEM of the LED light module.

In case the LED light module is elected to be replaced, e.g. as it is diagnosed to be defective; the LED driver module may be replaced (step 130) by another one. Then, the VLC code is transferred (step 140) from the LED light module back to the replacement LED driver module. The transfer may take place via the control connection CRTL or via communication over the LED driver current line DCL. The transferred VLC code is stored (step 150) in the data storage memory MEM of the LED driver module. As a result, both the LED light module and the replaced LED driver module hold the VLC code again, and the VLC code does not need to be reprogrammed into the modules, as it is restored therein automatically. It is noted that a similar approach applies to the replacement of the LED light module, mutatis mutandis. Similarly, in case both the LED drive nodule and the LED light module would require replacement, a replacement of for example the LED driver module could be performed first, using the steps as described above, followed by a replacement of the LED light module using the steps as described above (mutatis mutandis). It will be understood that alternatively, the LED light module could be replaced using the described steps first, followed by a replacement of the LED driver module using the described steps.

It is noted that the transfer of the VLC code in accordance with steps 100, 110, 120 may be performed as a preventive measure in case a defect would occur, e.g. as part of a start-up or an initialisation procedure. Likewise, such transfer of the VLC code may be performed periodically (e.g. at predetermined time intervals or at each power on or on each roll (i.e. change) of the VLC code in a rolling code system). Furthermore, such transfer of the VLC code may be performed when one of the modules requires replacement (e.g. when a diagnosing software routine indicates that an end of life is approaching).

The steps as described above with reference to FIG. 2 may be performed by a suitable controller of the module in question. For example, in the case of the driver module, the related steps may be performed by the microcontroller thereof. Likewise, in the LED light module, the associated steps may be performed by a control device, such as a microcontroller thereof.

FIG. 3 depicts a light unit LU comprising a light module LM and a driver module DM. The driver module DM is electrically connected to the light module LM by a connecting cable CC. The driver module and light module are both mounted to a mounting bracket MB, such as a frame, housing, etc. which further holds illumination optics, such as a diffuser, etc. The light module may for example be formed by a substrate, such as a printed circuit board, having LEDs on one side, being the lower side in the present view, and electronic components (such as switches to activate the LEDs and a memory as discussed with reference to FIG. 1) on the other side, being the upper side in the present view. The light unit may be connected to a lighting system by means of a network connection NC, such as communication bus, such as for example DMX or any of the other exemplary bus systems mentioned in the present document.

The invention claimed is:

1. A method of replacing one of a light module and a driver module of a light unit,
the light module being configured for emitting light when driven by an electrical driving signal; and
the driver module being connected to the light module and configured for driving the light module by providing to the light module, the electrical driving signal,
wherein the light module and the driver module each comprise a data storage memory configured for storing data,
wherein a visual light communication, VLC, code has been stored in one of the data storage memory of the light module and the data storage memory of the driver module,
wherein the driver module is configured to drive the light module so as to optically emit, by means of a modulation of a light output of the light module, information based on the VLC code as stored in the one of the light module and the driver module,
the method comprising:
a) reading the VLC code from the one of the data storage memory of the light module and the data storage memory of the driver module;
b) transferring the VLC code via a connection between the light module and the driver module;
c) storing the transferred VLC code in the other one of the light module and the driver module;
d) electing one of the light module and the driver module for replacement;
e) replacing the one of the light module and the driver module elected for replacement; and
f) transferring the VLC code from the other one of the light module and the driver module to the replaced one of the light module and the driver module and
g) storing the transferred VLC code in the data storage memory of the replaced one of the light module and the driver module.

2. The method according to claim 1, wherein steps a)-c) are performed as part of an initialisation procedure.

3. The method according to claim 1, wherein steps a)-c) are performed periodically.

4. The method according to claim 1, wherein steps a)-c) are performed in response to a change of the VLC code in the one of the data storage memory of the light module and the data storage memory of the driver module.

5. The method according to claim 1, wherein steps a)-c) are performed when one of the light module and the driver module is diagnosed to be defective.

6. The method according to claim 1, wherein the VLC code is a VLC configuration initialisation code.

7. The method according to claim 1, wherein the one of the data storage memory of the light module and the data storage memory of the driver module is the data storage memory of the driver module.

8. A method of replacing a light module and a driver module of a light unit, the method comprising:
replacing one of the light module and the driver module of the light unit in accordance with the method of claim 1, and successively,
replacing the other one of the light module and the driver module of the light unit in accordance with the method of claim 1.

9. A light unit comprising:
a light module configured for emitting light when driven by an electrical driving signal; and
a driver module connected to the light module and configured for driving the light module by providing the electrical driving signal,
the light module and the driver module each comprising a data storage memory configured for storing data,
wherein a visual light communication (VLC) code has been stored in one of the data storage memory of the light module and the data storage memory of the driver module,
wherein the driver module is configured to drive the light module so as to optically emit, by means of a modulation of a light output of the light module, VLC information based on the VLC code as stored in the one of the light module and the driving module,
the light unit being configured for:
a) reading the VLC code from the one of the data storage memory of the light module and the data storage memory of the driver module;
b) transferring the VLC code via a connection between the light module and the driver module;
c) storing the transferred VLC code in the other one of the light module and the driver module;
and when one of the light module and the driver module has been elected for replacement and replaced, transferring the VLC code from the other one of the light module and the driver module to the replaced one of the light module and the driver module and storing the transferred VLC code in the data storage memory of the replaced one of the light module and the driver module.

10. The light unit according to claim 9, wherein the light unit is configured for performing a)-c) as part of an initialisation procedure.

11. The light unit according to claim 9, wherein the light unit is configured for performing a)-c) periodically.

12. The light unit according to claim 9, wherein the light unit is configured for performing a)-c) in response to a change of the VLC code in the one of the data storage memory of the light module and the data storage memory of the driver module.

13. The light unit according to claim 9, wherein the light unit is configured for performing a)-c) when one of the LED light module and the LED driver module is diagnosed to be defective.

14. The light unit according to claim 9, wherein the VLC code is a VLC configuration initialisation code.

15. The light unit according to claim 9, wherein the one of the data storage memory of the light module and the data storage memory of the driver module is the data storage memory of the driver module.

16. An LED lighting system comprising:
a light unit, comprising:
a light module configured for emitting light when driven by an electrical driving signal; and
a driver module connected to the light module and configured for driving the light module by providing the electrical driving signal,
the light module and the driver module each comprising a data storage memory configured for storing data,
wherein a visual light communication (VLC) code has been stored in one of the data storage memory of the light module and the data storage memory of the driver module,
wherein the driver module is configured to drive the light module so as to optically emit, by means of a modulation of a light output of the light module, VLC information based on the VLC code as stored in the one of the light module and the driving module,
the light unit being configured for:
a) reading the VLC code from the one of the data storage memory of the light module and the data storage memory of the driver module;
b) transferring the VLC code via a connection between the light module and the driver module;
c) storing the transferred VLC code in the other one of the light module and the driver module; and
when one of the light module and the driver module has been elected for replacement and replaced, transferring the VLC code from the other one of the light module and the driver module to the replaced one of the light module and the driver module and storing the transferred VLC code in the data storage memory of the replaced one of the light module and the driver module; and
a frame configured to mount the light module and driver module thereon.

* * * * *